Sept. 18, 1934.  R. R. JONES  1,974,279
FLOOR COVERING
Filed Dec. 26, 1931

INVENTOR
Robert R. Jones
BY
ATTORNEYS

Patented Sept. 18, 1934

1,974,279

UNITED STATES PATENT OFFICE 1,974,279

FLOOR COVERING

Robert R. Jones, Akron, Ohio, assignor to The Firestone Tire & Rubber Company, Akron, Ohio, a corporation of Ohio Application December 26, 1931, Serial No. 583,229

2 Claims. (Cl. 154—49)

This invention relates to floor coverings such as rubber floor coverings, and more especially it relates to rubber floor coverings having metal reinforcement therein.

Rubber floor coverings have been found to possess many advantages over other floor coverings among which advantages may be mentioned their resilience which makes them less tiresome to walk upon, their non-absorbent quality which makes them easy to keep clean, their quality of being noiseless, and in factory installations reduce damage and breakage of tools which may be dropped upon them. Among the disadvantages of rubber floor coverings as heretofore constructed are slipperiness when wet, and the fact that a heavy vehicle moving over the floor covering causes a traction wave which bulges the covering and loosens it from the underlying flooring to which it normally is secured.

The chief objects of this invention are to provide an improved rubber floor covering that will not be subject to traction waves when passed over by heavy vehicles or trucks; and which will not be slippery when wet. Another object is to provide a reinforced floor covering that may be rolled up for convenience of storing or transporting.

Figure 1:
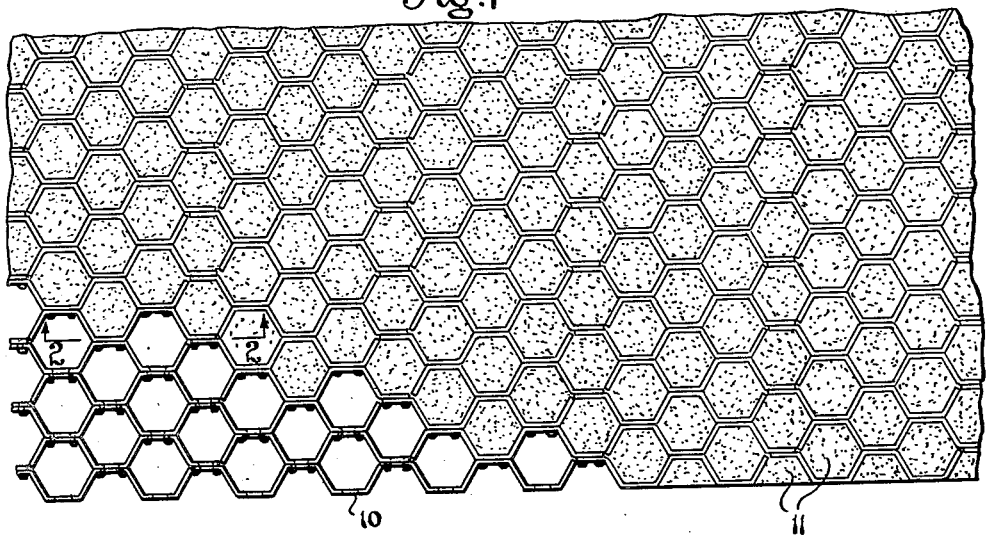
Figure 1 is a plan view of floor covering material embodying the invention in its preferred form, a part being broken away.

Referring to the drawing, the floor covering is shown as sheet material comprising a metallic reinforcement 10 that is reticulate in form, and a rubber structure 11 filling the interstices of said reinforcement. The metal reinforcing structure may be made of brass or it may be made of steel and brass plated, the rubber structure 11 being bonded to the metal by vulcanization. Preferably the reinforcement 10 is composed of metal strips disposed upon edge, and so bent that when a plurality of the strips are joined together they describe an orderly arrangement of geometric figures, such as the hexagons shown. The metal strips are joined to each other by tongues or lugs 12, 12 struck out from the strips, which tongues extend through apertures 13, 13 formed in other strips, the tongues being clinched to tie the strips firmly together. The tongues 12 do not completely fill the apertures 13, but leave substantial space for the rubber 11 in adjacent interstices of the reinforcing structure to flow through and unite in a mechanical bond to form a unitary structure which measurably adds to the durability of the floor covering. The reinforcing structure may be supplied in small units, and then assembled to the size and shape desired.

Figure 2:
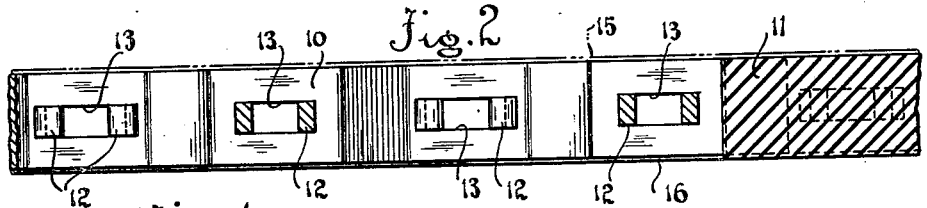
Figure 2 is a section on the line 2—2 of Figure 1.

The rubber structure 11 is formed by filling the interstices of the reinforcing structure with unvulcanized rubber composition, and then vulcanizing under heat and pressure in a suitable platen press. In order to secure adequate pressure and to assure complete filling of the interstices of the reinforcing structure 10 a surplus of rubber is employed, which surplus may overflow and form a film or thin layer on the top and bottom of the covering and thus cover the edges of the metal reinforcement, as is shown at 15, 16 respectively in Figure 2. The layer 15 on top of the floor covering may be buffed off, or it may be left to wear off if desired. The layer 16 on the bottom of the floor covering is not objectionable since this face is adhered to the floor of a room by a suitable adhesive such as rubber cement, bitumen or mastic.

The floor covering is made in sections of suitable size for convenient handling or manufacture. The covering retains all the advantages of ordinary rubber floor covering, and in addition achieves the several advantages set forth in the foregoing statement of objects. The bonding of the rubber to the metal reinforcement by vulcanization prevents separation of the rubber and metal from local deformation of the rubber, and thereby prevents the entrance of dirt or other matter. The use of brass as a reinforcing material, or the brass plating of a steel reinforcing structure prevents rusting of the metal which would cause separation of the rubber therefrom. The use of brass or brass-plating on steel also causes the rubber to become chemically adhered or bonded by vulcanization to the metal. The adhering or bonding of the rubber to the metal provides a better union between the metal armor and the rubber and also prevents moisture entering the inner surfaces of the metal reinforcement, thereby further preventing internal rusting or corrosion.

Figure 4:
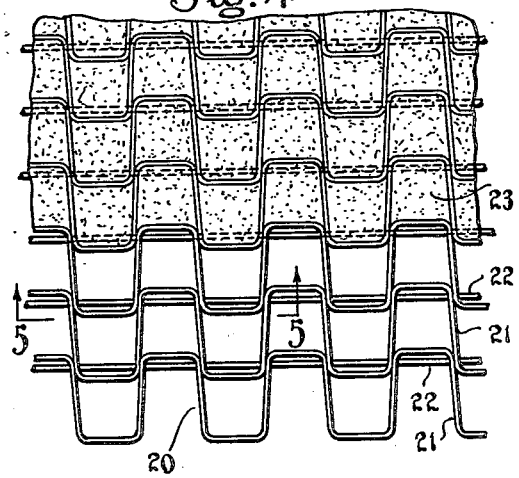
Figure 4 is a plan view of floor covering constituting another embodiment of the invention.
Figure 3:
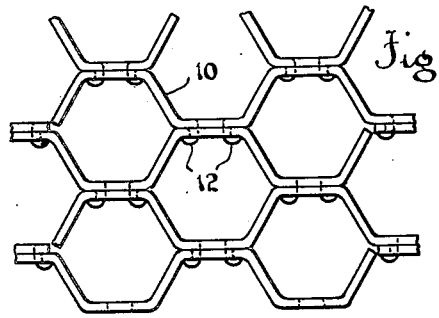
Figure 3 is a detail plan view of the reinforcement employed in the floor covering.
Figure 5:
Figure 5 is a section on the line 5—5 of Figure 4.

In the embodiment of the invention shown in Figures 4 and 5 I employ a reinforcing structure 20 comprising flat metal strips 21, 21 that are formed in a succession of angular loops which are disposed parallel to each other in interfitted relation and joined together by rods 22, 22, the arrangement being such as to provide a structure that is flexible in one direction which permits it to be rolled. The strips 20 are of the same material as the strips constituting the previously described reinforcement 10, and the interstices of the reinforcement 20 are filled with rubber composition 23 that is substantially flush with the top and bottom surfaces of the reinforcement, and is vulcanized thereto.

The modified embodiment of the invention possesses all the advantages of the previously described embodiment, and in addition is longitudinally flexible which facilitates its manufacture in long lengths and shipping and storage in rolls.

Other modifications are possible within the scope of the appended claims which are not limited wholly to the specific construction shown and described.

What is claimed is:

1. In a floor covering the combination of a reinforcing structure comprising metal strips disposed on edge and linked together to provide longitudinal flexibility of the assembled structure, and flexible rubber composition filling the interstices of the reinforcing structure to afford a continuous wearing surface and mechanically interlocked therewith, whereby the assembly may be longitudinally rolled.

2. In a floor covering the combination of a metal reinforcing structure comprising metal strips disposed upon edge and extending vertically from the upper to the lower surface of said floor covering, whereby loads may be transmitted to said reinforcement from the upper to the lower surface of the covering, and a resilient rubber structure vulcanized between and bonded to the sides of said metal strips to provide a wearing surface of rubber and exposed metal on said covering, the bonding of said rubber to the sides of said metal strips providing a protective covering thereon whereby water and corrosive liquids are prevented from seeping through said covering between the filler material and said metal strips.

ROBERT R. JONES.